(12) United States Patent
Kotlov

(10) Patent No.: US 6,754,684 B1
(45) Date of Patent: Jun. 22, 2004

(54) METHOD AND APPARATUS FOR MEDIAN FILTER ON SIMD ARCHITECTURE DIGITAL DATA PROCESSOR

(75) Inventor: Valeri Kotlov, Woburn, MA (US)

(73) Assignee: Mercury Computer Systems, Inc., Foxboro, MA (US)

( * ) Notice: Subject to any disclaimer, the term of this patent is extended or adjusted under 35 U.S.C. 154(b) by 374 days.

(21) Appl. No.: 09/853,874

(22) Filed: May 11, 2001

Related U.S. Application Data

(60) Provisional application No. 60/203,740, filed on May 11, 2000.

(51) Int. Cl.$^7$ .............................. G06F 7/00; G06F 17/10
(52) U.S. Cl. ........................................ 708/202; 708/304
(58) Field of Search ................................ 708/202, 304; 382/262

(56) References Cited

U.S. PATENT DOCUMENTS

| | | | | |
|---|---|---|---|---|
| 5,900,006 A | * | 5/1999 | Yoon | 708/202 |
| 5,912,826 A | * | 6/1999 | Bangham et al. | 708/300 |
| 6,058,405 A | | 5/2000 | Kolte et al. | |
| 6,160,913 A | * | 12/2000 | Lee et al. | 382/176 |
| 6,163,324 A | * | 12/2000 | Holder | 345/505 |
| 6,603,877 B1 | * | 8/2003 | Bishop | 382/165 |

OTHER PUBLICATIONS

Kolte, et al., "A Fast Median Filter Using AltiVec," *Proceedings of the IEEE International Conference on Computer Design*, Copyright © 1998 Institute of Electrical and Electronics Engineers, Inc.

Performance Table: AltiVec Performance Comparison Table (date of publication Sep. 12, 1997) Internet Printout: wysiwyg://2/http://developer.apple . . . hardware/ve/performance_table.html.

* cited by examiner

*Primary Examiner*—Tan V. Mai
(74) *Attorney, Agent, or Firm*—David J. Powsner; Nutter, McClennen & Fish

(57) ABSTRACT

The invention provides improved methods and systems for rapidly performing a median filter calculation for a value at a predetermined position in a matrix of values representing a neighborhood about the predetermined position. The method includes ordering the values in each column of the matrix to create an ordered matrix having rows; determining a maximum value for a row of the ordered matrix having the lowest values; determining a median value for a row of the ordered matrix having middle values; and determining a minimum value for a row of the ordered matrix having the highest values. Based on these determinations, the median filter value for the neighborhood can be calculated as a second median value of the maximum value for a row of the ordered matrix having the lowest values, median value for a row of the ordered matrix having middle values, and minimum value for a row of the ordered matrix having the highest values. The calculated median filter value can then be output as necessary. The rows of the matrices can conveniently be represented as vectors and ordering and determining steps can be performed as vector operations.

52 Claims, 2 Drawing Sheets

US 6,754,684 B1

METHOD AND APPARATUS FOR MEDIAN FILTER ON SIMD ARCHITECTURE DIGITAL DATA PROCESSOR

RELATED APPLICATIONS

This invention claims the benefit of priority of United States Patent Application Serial No. 60/203,740, filed May 11, 2000, and entitled "METHOD AND APPARATUS FOR MEDIAN FILTER ON SIMD ARCHITECTURE DIGITAL DATA PROCESSOR."

BACKGROUND OF THE INVENTION

The invention pertains to digital data processing and, more particularly, to improved methods and apparatus for performing median filter operations.

A wide variety of computing and image processing applications call for the processing of two dimensional images, typically for printing the image or for electronic display such as by display on a computer screen. Very often, the images needing display will have any number of random, impulse or single pixel noise problems that can be corrected using an appropriate filtering technique. One popular filtering technique for addressing these noise issues is median filtering. A median filter computes the output value of each pixel in an image as the median value of pixels in a small neighborhood around the pixel of interest—essentially replacing each pixel output with the median output value of its neighborhood. A common neighborhood used in median filtering is a 9-pixel, 3×3 square centered on the pixel of interest.

Because images can contain large numbers of pixels, and also because some applications call for the filtering of large numbers of images, execution time for calculating medians has a large impact on the performance of the software applications that employ median filtering. One approach to improving the performance of median filters has been to perform the filtering using SIMD processors. In a SIMD (single instruction, multiple data) processor, a single instruction operates on a vector register that holds multiple values. This is in contrast to a conventional processor in which each instruction operates on only a single data value. One class of recent SIMD processors employ the AltiVec™ technology, of Motorola, that is capable of concurrently operating on vectors with 4, 8 or 16 values.

Notwithstanding the benefits of array processors such as the AltiVec™, image processing times can be significantly reduced by even slight improvements in methods for calculating medians or in programming techniques that increase the throughput of median calculations through the array processor, the throughput typically being measured in clock cycles per pixel, or alternatively in clock cycles per (16 byte) vector.

In view of the foregoing, an object of the invention is to provide improved methods and apparatus for digital image processing.

A more particular object is to provide such methods and apparatus as permit the rapid execution of median filtering on a two dimensional data set.

SUMMARY OF THE INVENTION

These and other objects are attained by the present invention which provides, in some aspects, novel methods for calculating median filter values that increase the speed with which the calculation can be performed.

A method according to one aspect of the invention provides for rapidly performing a median filter calculation for a value at a predetermined position in a matrix of values representing a neighborhood about the predetermined position. The method includes ordering the values in each column of the matrix to create an ordered matrix; determining a maximum value for a row of the ordered matrix having the lowest values; determining a median value for a row of the ordered matrix having middle values; and determining a minimum value for a row of the ordered matrix having the highest values. Based on these determinations, the median filter value for the neighborhood can be calculated as a median value of the maximum value for a row of the ordered matrix having the lowest values, median value for a row of the ordered matrix having middle values, and minimum value for a row of the ordered matrix having the highest values. The calculated median filter value can then be output as necessary. The rows of the matrices can conveniently be represented as vectors and the ordering and determining steps can be performed as vector operations.

In a further aspect, the invention provides a method for rapidly performing a plurality of median filter calculations for a value at a predetermined position in a matrix of values representing a 3×3 neighborhood about the predetermined position. The method includes inputting rows for median filtering, the number of rows being one more than the number of rows in the neighborhood; presorting rows that will participate in more than one median filter calculation; separating the input rows into separate matrices, each having the pre-sorted rows and one unsorted row; ordering the values in each column of each matrix to result in ordered matrices; determining a maximum value for a row of each ordered matrix having the lowest values; determining a median value for a row of each ordered matrix having middle values determining a minimum value for a row of each ordered matrix having the highest values; and determining the median filter values as a median value of the previously determined maximum value for a row of each ordered matrix having the lowest values, median value for a row of each ordered matrix having middle values, and minimum value for a row of each ordered matrix having the highest values.

In either aspect, the matrix rows can be represented as vectors that include more than three values, and thus more values than are found in a 3×3 neighborhood for a single median filter calculation. The calculations on the ordered matrices can be performed using vector operations to simultaneously result in a plurality of triplet maximum, median and minimum values stored in a single output vector. The calculation of the median filter value corresponding to the plurality of triplet maximum, median and minimum values can then also be carried out with four vector operations to simultaneously produce a plurality of median filter results. In addition, vector loading and processing instructions can be interleaved to reduce the overall number of clock cycles. An apparatus and computer code product for carrying out the invention are also described.

These and other aspects of the invention have the advantage of permitting rapid median filter calculations without excessive use of system resources.

BRIEF DESCRIPTION OF THE DRAWINGS

The invention will be more fully understood from the following detailed description taken in conjunction with the accompanying drawings, in which.

DETAILED DESCRIPTION OF THE DRAWINGS

Figure 1:
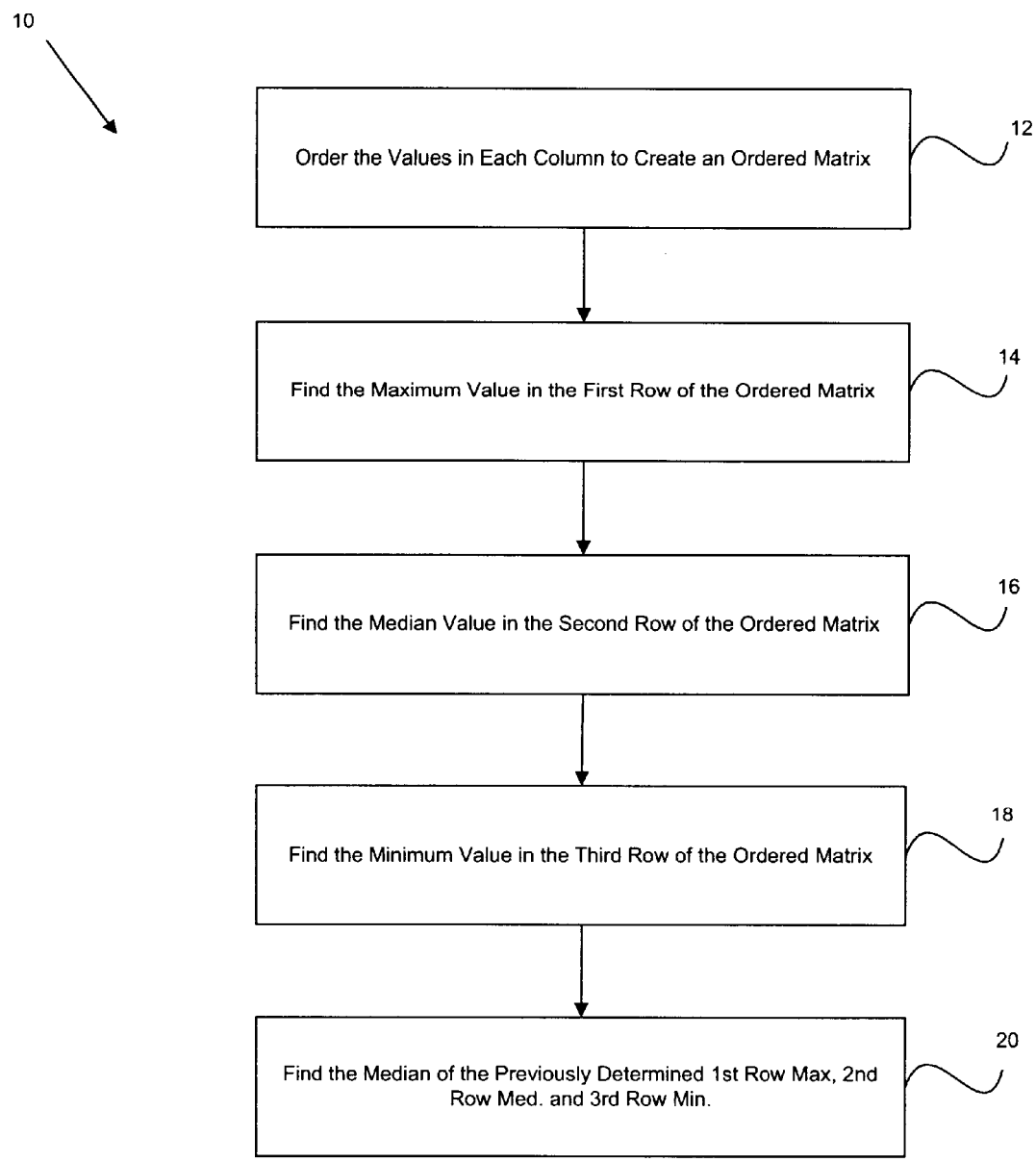
FIG. 1 is a flow chart showing a series of steps performed in one embodiment of the invention for calculating median filter values.

A method 10 according to the invention for performing median filter calculations is illustrated in FIG. 1. This method can be advantageously practiced on a digital data processing system having vector processing capabilities, such as the PowerPC AltiVec processor and the embodiments below are accordingly described with reference to AltiVec functionality. It will be appreciated, however, that such methods can be carried out using any other suitable processor or processor architecture, as will be apparent to the person of ordinary skill in the art in view of the discussion that follows.

The illustrated embodiment of the invention employs a principle providing that ordering elements of an original 3×3 matrix so that each column is placed in ascending order, then ordering the elements of each row in ascending order to result in a matrix:

$$\begin{vmatrix} a_0 & a_1 & a_2 \\ b_0 & b_1 & b_2 \\ c_0 & c_1 & c_2 \end{vmatrix} \quad \text{Matrix (1)}$$

(Ordered Matrix)

where $a_0 \leq a_1 \leq a_2$; $b_0 \leq b_1 \leq b_2$; and $c_0 \leq c_1 \leq c_2$; and $a_0 \leq b_0 \leq c_0$; $a_1 \leq b_1 \leq c_1$; and $a_2 \leq b_2 \leq c_2$; allows the median for the original 3×3 matrix to be calculated by taking a median of three elements: $a_2$ (the maximum of the first row), $b_1$ (the median of the second row) and $c_0$ (the minimum of the third row). That the median of a matrix so ordered is the median of $a_2$, $b_1$ and $c_0$ can be shown by considering the number of possible intra-matrix value relations after ordering:

Every element in ordered Matrix (1) must fall into one of three groups:

Small {s, s, s, s};
Big={b, b, b, b}; and
Median={m}.

That is, every group of nine values will have one median value (by definition, the median is the value at which an equal number of group members fall above and below the median), four "big" values (that is, four values greater than the median) and four "small" values (that is, four values smaller than the median). Given these groups, ordered Matrix (1) can have six possible structures of big, small and median values (where, in any of the structures, the columns could be rearranged):

$$\begin{vmatrix} s & m & s \\ s & b & s \\ b & b & b \end{vmatrix} \quad \text{Matrix (2)}$$

(Median in row a)

$$\begin{vmatrix} s & m & s \\ s & b & b \\ s & b & b \end{vmatrix} \quad \text{Matrix (3)}$$

(Median in row a)

$$\begin{vmatrix} s & s & s \\ s & m & b \\ b & b & b \end{vmatrix} \quad \text{Matrix (4)}$$

(Median in row b)

$$\begin{vmatrix} s & s & b \\ s & m & b \\ s & b & b \end{vmatrix} \quad \text{Matrix (5)}$$

(Median in row b)

$$\begin{vmatrix} s & s & b \\ s & s & b \\ b & m & b \end{vmatrix} \quad \text{Matrix (6)}$$

(Median in row c)

$$\begin{vmatrix} s & s & s \\ b & s & b \\ b & m & b \end{vmatrix} \quad \text{Matrix (7)}$$

(Median in row c)

Reviewing each of these possible structures, it becomes clear that if x is the maximum of the elements of row a, y is the median of the elements of row b, and z is the minimum of row c, then the median of all nine values in the original 3×3 matrix=median(x, y, z).

Accordingly, a method of the invention for finding the median value in a 3×3 matrix of values can be characterized according to FIG. 1 as a series of steps 10 in which the first step 12 is to order the values in each column to create an ordered matrix, the second step 14 is to find the maximum value in the first row of the ordered matrix, the third step 16 is to find the median value in the second row of the ordered matrix, the fourth step 18 is to find the minimum value of the third row in the ordered matrix, and the fifth step 20 is to find the median value of the previously determined maximum of the first row, median of the second row and minimum of the third row—this median being the median of the original 3×3 matrix. A person of ordinary skill in the art will recognize that the order of the steps is important only for the first 12 and last 20 steps, and that the intermediate steps 14, 16, 18 can be carried out in any convenient order.

The method of FIG. 1 can readily be applied to large groups of overlapping 3×3 matrices, and can also readily be applied on a SIMD processor to result in faster median calculation throughput than is available using known median filter calculating methods.

Figure 2:
FIG. 2 is a flow chart showing a series of steps performed in a further embodiment of the invention for calculating median filter values.

In a further aspect of the invention illustrated in FIG. 2, a median calculating method 60 is applied to matrices that have four or more rows and N columns, where N is preferably a multiple of the vector length of a SIMD processor being used to perform the method. Using the AltiVec processor as an illustrative example, vectors are 128 bits, or 16 bytes wide. This allows for 16-way parallelism for 8-bit signed and unsigned integers and characters, 8-way parallelism for 16-bit signed and unsigned integers, and 4-way parallelism for 32-bit signed and unsigned integers and IEEE floating-point numbers. Accordingly, if pixels are represented, for example, as 32-bit integer values, a median filtering method according to the invention would preferably be applied to matrices having four or more rows and N columns where N is a multiple of four. This allows the method to be carried out across all of the columns by a whole number of vector operations as each vector would contain four 32-bit operands. Accordingly, a matrix on which median filtering methods of the invention may be employed would have a structure such as:

$$\begin{array}{l} \text{row a} \\ \text{row b} \\ \text{row c} \\ \text{row d} \end{array} \begin{vmatrix} 2 & 5 & 12 & 4 & ... \\ 7 & 15 & 10 & 0 & ... \\ 8 & 9 & 6 & 11 & ... \\ 3 & 13 & 1 & 14 & ... \end{vmatrix} \quad \text{Matrix (8)}$$

(Example input matrix)

where the ellipses represent further groups of four columns.

In addition, while four rows are illustrated in the exemplary input matrix, in the first step of this method 60 of the invention, any number of rows greater than or equal to four may be input 62 for the purpose of calculating 3×3 medians (that is, there will be at least one more row in the input matrix than the number of rows in the median calculation neighborhood).

Next, rows that would otherwise participate in two passes (for example, rows b and c are both used in calculating medians matrices resulting from calculations for 3×3 matrices using rows a, b an c, as well as those using rows b, c and d) are sorted 64 once prior to making those passes. This reduces by at least two the combined number of instructions necessary to generate median values for both passes. It also reduces by almost two-fold the number of memory accesses necessary to load data into the vector registers. This pre-sorting can be performed on an AltiVec processor by replacing row (b) in Matrix (8) with the results of a vector minimum instruction performed using rows (b) and (c) as inputs and by replacing row (c) in Matrix (8) with the results of a vector maximum instruction performed using rows (b) and (c) as inputs to result in Matrix (9) below:

$$\begin{array}{l} \text{row a} \\ \text{row b} \\ \text{row c} \\ \text{row d} \end{array} \begin{vmatrix} 2 & 5 & 12 & 4 & ... \\ 7 & 9 & 6 & 0 & ... \\ 8 & 15 & 10 & 11 & ... \\ 3 & 13 & 1 & 14 & ... \end{vmatrix} \quad \text{Matrix (9)}$$

(Pre-Sorted matrix)

Pre-Sorted Matrix (9) can then be separated 66 into two three-row matrices for median calculation passes by adding row (a) to pre-sorted rows (b) and (c) tog form a first separated three-row Matrix (10) and adding row (d) to pre-sorted rows (b) arid (c) to form a second separated three-row Matrix (11):

$$\begin{array}{l} \text{row a} \\ \text{row b} \\ \text{row c} \end{array} \begin{vmatrix} 2 & 5 & 12 & 4 & ... \\ 7 & 9 & 6 & 0 & ... \\ 8 & 15 & 10 & 11 & ... \end{vmatrix} \quad \text{Matrix (10)}$$

(First Separated Three-Row matrix)

$$\begin{array}{l} \text{row d} \\ \text{row b} \\ \text{row c} \end{array} \begin{vmatrix} 3 & 13 & 1 & 14 & ... \\ 7 & 9 & 6 & 0 & ... \\ 8 & 15 & 10 & 11 & ... \end{vmatrix} \quad \text{Matrix (11)}$$

(Second Separated Three-Row matrix)

As shown in Matrices (10) and (11), the row that is added to the pre-sorted rows can be added in a consistent position (i.e., as the first row of the three-row matrices) so that the same series of sorting instructions can be used for both matrices given that for both the last two of the three rows are pre-sorted. While this exemplary embodiment uses an input matrix having four rows, pre-sorting two rows and separating the four-row matrix into two three-row matrices for further processing, a person of ordinary skill in the art will recognize that other configurations are possible depending on the capabilities of the processing system and the desired degree of simultaneity in processing the matrices. In the further description of an embodiment of the invention below, the processing of Matrix (10) will be described with particularity. The instructions for the processing of Matrix (11) can be interleaved with those for the processing of Matrix (10) to take advantage of the pre-loading and sorting of rows (b) and (c) as well as to take advantage of the inherent properties of a SIMD processor. For a specific embodiment of such processing, the source code included at pages 10 to 29 of U.S. provisional patent application No. 60/203,740, filed May 11, 2000 (and from which the present application claims priority) is hereby incorporated by reference.

Processing of Matrix (10) continues by completing the sorting 68 of values in each column of the matrix (and thus completing step 12 of the method described with respect to FIG. 1). This can be accomplished by replacing row (a) in Matrix (10) with the results of a vector minimum instruction performed using row (a) and row (b) (which contains the minimum value of original rows (b) and (c)) as inputs and by replacing row (c) in Matrix (10) with the results of a vector maximum instruction performed using rows (a) and (c) (which contains the maximum value of original rows (b) and (c)) as inputs to result in ordered Matrix (12) below:

$$\begin{array}{l} \text{row a} \\ \text{row b} \\ \text{row c} \end{array} \begin{vmatrix} 2 & 5 & 6 & 0 & ... \\ 7 & 9 & 10 & 4 & ... \\ 8 & 15 & 12 & 11 & ... \end{vmatrix} \quad \text{Matrix (12)}$$

(Ordered matrix)

Once ordered Matrix (12) has been prepared, processing on this matrix can proceed to the intermediate steps of FIG. 1, that is, finding the maximum value for the first row 14, finding the median value for the second row 16, and finding the minimum value for the third row 18.

The rows of Matrix (12) are shown having four values because four is one convenient number of values that can form a single vector for use with a SIMD processor, however, because in our example we are calculating median values for a 3×3 neighborhood, the values in each row must be separated into triplets in order to carry out the steps 14, 16, and 18.

To find the maximum value of the triplets in the first row 70 of the ordered Matrix (12), a vector maximum operation is performed using row(a) and a right shifted version of row(a) as inputs. As used herein, "right shifted" refers to shifting each value within a vector one position to the right, or increasing the index of its position by one. "Left shifted" refers to moving the values to the left within the vector. If the columns of Matrix (12) are numbered 0 through 3, then the vector resulting from this vector maximum operation will have the maximum of a null value and a the value in column 0 in its first position, the maximum of the value in column 0 and the value in column 1 in its second position, the maximum of the value in column 1 and the value in column 2 in its third position, and the maximum of the value in column 2 and the value in column 3 in its fourth position. The vector having the results from the vector maximum operation can be denominated "max_row(a) ?0, 01, 12, 23". Next, a vector maximum operation can be performed on max_row(a) ?0, 01, 12, 23 and a left shifted form of row (a) to result in a vector that can be denominated "max_row(a) ?01, 012, 123, 234"—the maximum of the two illustrated triplets in row(a) can be found in the second and third positions of this vector.

This latest vector can also include in its forth position the maximum value of columns 2, 3 and 4, a value that can be used to calculate the 3×3 median about the value at row(b), column(3) of input Matrix (8). However, the maximum value of columns 2, 3 and 4 can only be calculated if the values in column 4 are available—when row(b) of input Matrix (8) was loaded into a vector array (in our example) only the values in columns 0 through 3 were included, values in further columns were represented simply by ellipses. One way in which the values in column 4 can be made available is to interleave the vector loading and processing instructions for the values in columns 4 through 7 of our representative rows. In this way, a series of vectors containing the rows of an ordered matrix corresponding to ordered Matrix (12) and containing values for columns 4 through 7 can be available at the time that the triplet maximum calculations are occurring on row(a). A specific example of such interleaving is disclosed in the source code included at pages 10 to 29 of U.S. patent application serial No. 60/203,740, which has been incorporated by reference above.

In the next step of our exemplary median filter calculation of the invention, the median value for each triplet in row(b) is calculated 72. The first step in calculating the required median values is to perform a vector minimum operation on row(b) and a right shifted form of row(b) to obtain a vector denominated "min_row(b) ?0, 01, 12, 23". Next, a vector maximum operation is performed on row(b) and a right shifted form of row(b) to obtain a vector denominated "max_row(b) ?0, 01, 12, 23". A temporary vector can next be filled with the values from a vector maximum operation performed using the min_row(b) ?0, 01, 12, 23 vector and a left shifted form of the row(b) vector as inputs. A vector denominated med_row(b) ?01, 012, 123, 234 (this vector containing the median values for this row for the columns in different triplets as indicated by the naming convention) can then be formed by performing a vector minimum operation on the temporary vector created above and the max_row(b) ?0, 01, 12, 23 vector. In this way, the median of each triplet centered within the input vector (the middle row from our ordered Matrix (12)) can be calculated with two vector maximum and two vector minimum instructions.

The next calculation in our exemplary median filter calculation is to find the minimum values of the triplets in the third row 74 (row(c)) of ordered Matrix (12). To find these minimum values, a vector minimum operation is formed using row(c) and a right shifted version of row(c). The vector having these minimums can be denominated "min_row(c) ?0, 01, 12, 23". Next, a vector minimum operation can be performed on min_row(c) ?0, 01, 12, 23 and a left shifted form of row(c) to result in a vector that can be denominated "min_row(c) ?01, 012, 123, 234" and contains the minimum values for the triplets as indicated by the naming convention.

The final 20 step of the method of FIG. 1 is applied to, for each 3×3 median being calculated, find the median of the previously determined maximum value for the corresponding triplet in the first row, median value for the corresponding triplet in the second row and minimum value for the corresponding triplet in the third row 76. This calculation can be performed for all of centers of the 3×3 neighborhoods in a the row of interest simultaneously by forming a new triplet value matrix using the vector outputs from the calculations above having a format as follows:

| row(x) | max_row(a) | ?01, 012, 123, 234 | Matrix (13) |
|---|---|---|---|
| row(y) | med_row(b) | ?01, 012, 123, 234 | |
| row(z) | min_row(c) | ?01, 012, 123, 234 | |

(Triplet Value Matrix)

In this way, the desired median filter value can be found for each value in row(b) of input Matrix (8) in each column. For the value in column 0, there is no 3×3 neighborhood (and thus column 0 of triplet value Matrix (13) includes a "?"), and this boundary-effect situation can be dealt with in any manner known in the art. For the values in columns 1, 2 and 3 in row(b) of input Matrix (8), the median filter values will correspond to the medians for the three values in columns 1, 2 and 3 of triplet value Matrix (13), respectively. All of these median values, and thus the median filter values for the desired positions, can be calculated in four vector operations based on the vectors represented in triplet value Matrix 13.

The first operation can be to perform a vector minimum operation on row(y) and row(z) of triplet value Matrix (13). A vector maximum operation can then be performed on the same two vectors. A vector maximum operation can next be performed using the row(x) of triplet value Matrix (13) and the result of the vector minimum of rows (y) and (z). Finally, the result of the result of the immediately preceding vector maximum operation and the result of the vector maximum instruction on rows (y) and (z) are used as inputs for a vector minimum operation that results in a vector having four values corresponding to the median value of each of the four columns of the triplet value Matrix (13), respectively and thus the desired median filter values. These values can be output from the calculation loop 78 to the desired output memory position for further use by the processing system. Of course, a person of ordinary skill in the art will recognize that other combinations of four vector processing steps can provide the desired result within the scope of the invention as well.

In one embodiment, a processing loop of the invention processes four groups of four columns on each pass through the loop, and processing loops through all columns in a table of values for which median filtering is desired. Similarly, in the embodiment described above, two rows of values for which median filtering is desired are processed simultaneously. A processing loop may continue to take values from the table two rows at a time until all of the desired rows have been processed.

A timing test performed using the above described embodiment of the, invention (and using the source code incorporated by reference above) to calculate 3×3 median filter values returns. 1.09 cycles per pixel. This corresponds to 17.44 or approximately 17 per 16 byte vector. Using input matrices having preferred shapes can improve performance of the calculations, for example, for a 32×512 input matrix, the measured time is 17.02 cycles. The source code can also be compiled for differing data types, for example, floating point, signed and unsigned byte (pixel), half word, or integer. This timing test performance compares favorably to other published approaches to median filtering. For example, a median filter calculation is described in Kolte, Priyadarshan, et al., "A Fast Median Filter Using AltiVec," where it is reported that "[t]he filter utilizes 16-way SIMD parallelism to filter images at rates of 1.15 cycles/pixel for 3×3 squares . . . " This rate corresponds to 1.15*16=18.4 or approximately 18 cycles per 16 byte vector. Similarly, an AltiVec Performance Table published by Apple Computer Corp. reports "Median Filter (3×3) 128×128 pixels—1.23

G4 cycles/pixel." This rate corresponds to 1.23*16=19.68 or approximately 19 cycles per 16 byte vector. The method and system of the invention provide median filtering at a faster pace than these reported systems.

The median filtering systems and methods of the invention can be implemented in any manner in which their logic can practically be carried out. The method can be embodied in software that can run on a variety of computers known in the art, including without limitation, personal computers, workstation computers, and supercomputers known in the art. In one preferred embodiment, the median filtering method of the invention is implemented in software and executed on a computer having one or more vector processors such as the PowerPC™ G4™ processor having AltiVec™ technology. An example of computer code useful for programming such a computer to carry out the method of the invention is included in U.S. patent application Ser. No. 60/203,740, from which this application claims priority, and which is incorporated by reference into this disclosure. In addition, the logic of the median filtering method of the invention can be implemented in a special purpose circuit, such as a circuit including ASICs having the specific logic employed herein deployed within the circuit, or in a system that combines such special purpose circuits with a general purpose computer with software.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for rapidly performing a median filter calculation on a computer processor having vector operation capability for a value at a predetermined position in a matrix of values representing a neighborhood about the predetermined position, the matrix having columns and rows, comprising the steps of:

inputting the matrix of values to the computer processor as an input matrix, the matrix rows being represented as vectors and the input matrix having one more row than the matrix of values representing a neighborhood;

ordering the values in each column of the matrix to create an ordered matrix having rows;

determining a maximum value for a row of the ordered matrix having the lowest values;

determining a median value for a row of the ordered matrix having middle values;

determining a minimum value for a row of the ordered matrix having the highest values;

determining a second median value of the previously determined maximum value for a row of the ordered matrix having the lowest values, median value for a row of the ordered matrix having middle values, and minimum value for a row of the ordered matrix having the highest values; and outputting by the computer processor of the second median value as a median filter value for the matrix;

wherein the ordering and determining steps are performed as vector operations by the computer processor.

2. The method of claim 1, wherein the ordering of values, within columns of the matrix is performed using two vector maximum operations and two vector minimum operations.

3. The method of claim 1, wherein the step of ordering of values in columns comprises:

presorting all but the first and last rows of the input matrix;

separating the input matrix into two matrices, each of the two matrices including the presorted rows and a different one of the first and last rows of the input matrix, a first one of the two matrices being selected for application of the further steps of the method.

4. The method of claim 3, wherein the further steps of the method are separately applied to a second of the two matrices.

5. The method of claim 4, wherein instructions for performing the further steps of the method for each of the two matrices are interleaved.

6. The method of claim 2, wherein matrix of values representing a neighborhood is a 3×3 matrix.

7. The method of claim 6, wherein the matrix rows represented as vectors include more than three values.

8. The method of claim 7, wherein the step of determining a maximum value for a row of the ordered matrix having the lowest values comprises determining a maximum value from among a triplet of values in the vector corresponding to that row in columns corresponding to the 3×3 neighborhood.

9. The method of claim 8, wherein determining a maximum from among a triplet of values comprises two vector maximum operations having the vector corresponding to the row of the ordered matrix having the lowest values, a left shifted form of that row, and a right shifted form of that row as inputs to result in an output vector containing maximum values for a plurality of triplets.

10. The method of claim 7, wherein the step of determining a minimum value for a row of the ordered matrix having the highest values comprises determining a minimum value from among a triplet of values in the vector corresponding to that row and in columns corresponding to the 3×3 neighborhood.

11. The method of claim 10, wherein determining a minimum from among a triplet of values comprises two vector minimum operations having the vector corresponding to the row of the ordered matrix having the highest values, a left shifted form of that row, and a right shifted form of that row as inputs to result in an output vector containing minimum values for a plurality of triplets.

12. The method of claim 7, wherein the step of determining a median value for a row of the ordered matrix having middle values comprises determining a median value from among a triplet of values in the vector corresponding to that row in columns corresponding to the 3×3 neighborhood.

13. The method of claim 12, wherein a plurality of triplet median values are determined using two vector maximum and two vector minimum instructions.

14. The method of claim 7, wherein a plurality of second median values are determined using two vector maximum and two vector minimum instructions applied to a vector having triplet maximum values for the ordered matrix row having the low values, a vector having triplet median values for the ordered matrix row having middle values, and a vector having triplet minimum values for the ordered matrix row having high values.

15. A computer apparatus for rapidly calculating median filter values for a predetermined position in a matrix of values representing a neighborhood about the predetermined position, the apparatus having vector processing capabilities and comprising:

control logic for inputting an input matrix for processing, the input matrix having one more row than the matrix of values representing a neighborhood before the step of ordering values;

control logic for ordering the values in each column of the matrix to create an ordered matrix having rows;

control logic for determining a maximum value for a row of the ordered matrix having the lowest values;

control logic for determining a median value for a row of the ordered matrix having middle values;

control logic for determining a minimum value for a row of the ordered matrix having the highest values;

control logic for determining a second median value of the previously determined maximum value for a row of the ordered matrix having the lowest values, median value for a row of the ordered matrix having middle values, and minimum value for a row of the ordered matrix having the highest values; and control logic for outputting the second median value as a median filter value for the matrix.

16. The apparatus of claim 15, wherein the control logic for ordering of values in columns comprises:

control logic for presorting all but the first and last rows of the input matrix;

control logic for separating the input matrix into two matrices, each of the two matrices including the presorted rows and a different one of the first and last rows of the input matrix, a first one of the two matrices being selected for application of the further steps of the method.

17. The apparatus of claim 16, wherein matrix of values representing a neighborhood is a 3×3 matrix.

18. The method of claim 17, wherein the matrix rows represented as vectors include more than three values.

19. The apparatus of claim 18, wherein the control logic for determining a maximum value for a row of the ordered matrix having the lowest values comprises control logic for determining a maximum value from among a triplet of values in the vector corresponding to that row in columns corresponding to the 3×3 neighborhood.

20. The apparatus of claim 19, wherein the control logic for determining a maximum from among a triplet of values comprises control logic for performing two vector maximum operations having the vector corresponding to the row of the ordered matrix having the lowest values, a left shifted form of that row, and a right shifted form of that row as inputs to result in an output vector containing maximum values for a plurality of triplets.

21. The apparatus of claim 18, wherein the control logic for determining a minimum value for a row of the ordered matrix having the highest values comprises control logic for determining a minimum value from among a triplet of values in the vector corresponding to that row and in columns corresponding to the 3×3 neighborhood.

22. The apparatus of claim 21, wherein the control logic for determining a minimum from among a triplet of values comprises control logic for performing two vector minimum operations having the vector corresponding to the row of the ordered matrix having the highest values, a left shifted form of that row, and a right shifted form of that row as inputs to result in an output vector containing minimum values for a plurality of triplets.

23. The apparatus of claim 18, wherein the control logic for determining a median value for a row of the ordered matrix having middle values comprises control logic for determining a median value from among a triplet of values in the vector corresponding to that row in columns corresponding to the 3×3 neighborhood.

24. The apparatus of claim 23, wherein the control logic for determining a plurality of triplet median values comprises two vector maximum and two vector minimum instructions.

25. The apparatus of claim 18, wherein a plurality of second median values are determined using two vector maximum and two vector minimum instructions applied to a vector having triplet maximum values for the ordered matrix row having the low values, a vector having triplet median values for the ordered matrix row having middle values, and a vector having triplet minimum values for the ordered matrix row having high values.

26. A computer product for rapidly calculating median filter values for a predetermined position in a matrix of values having columns and rows and representing a neighborhood about the predetermined position on a computing apparatus having vector processing capabilities, the computer program product comprising computer useable medium having computer readable code to:

order the values in each column of the matrix to create an ordered matrix having rows;

determine a maximum value for a row of the ordered matrix having the lowest values;

determine a median value for a row of the ordered matrix having middle values;

determine a minimum value for a row of the ordered matrix having the highest values;

determine a second median value of the previously determined maximum value for a row of the ordered matrix having the lowest values, median value for a row of the ordered matrix having middle values, and minimum value for a row of the ordered matrix having the highest values; and output the second median value as a median filter value for the matrix;

wherein the matrix rows are represented as vectors that include more values than the number of values in a row of the neighborhood.

27. The computer product of claim 26, wherein matrix of values representing a neighborhood is a 3×3 matrix.

28. The computer product of claim 27, wherein the matrix rows are represented as vectors that include more than three values.

29. The computer product of claim 28, wherein determining a maximum value for a row of the ordered matrix having the lowest values comprises determining a maximum value from among a triplet of values in the vector corresponding to that row in columns corresponding to the 3×3 neighborhood.

30. The computer product of claim 29, wherein determining a maximum from among a triplet of values comprises control logic for performing two vector maximum operations having the vector corresponding to the row of the ordered matrix having the lowest values, a left shifted form of that row, and a right shifted form of that row as inputs to result in an output vector containing maximum values for a plurality of triplets.

31. The computer product of claim 28, wherein determining a minimum value for a row of the ordered matrix having the highest values comprises determining a minimum value from among a triplet of values in the vector corresponding to that row and in columns corresponding to the 3×3 neighborhood.

32. The computer product of claim 31, wherein determining a minimum from among a triplet of values comprises performing two vector minimum operations having the vector corresponding to the row of the ordered matrix having the highest values, a left shifted form of that row, and a right shifted form of that row as inputs to result in an output vector containing minimum values for a plurality of triplets.

33. The computer product of claim 28, wherein determining a median value for a row of the ordered matrix having middle values comprises determining a median value from among a triplet of values in the vector corresponding to that row in columns corresponding to the 3×3 neighborhood.

34. The computer product of claim 33, wherein determining a plurality of triplet median values comprises two vector maximum and two vector minimum instructions.

35. The computer product of claim 28, wherein a plurality of second median values are determined using two vector maximum and two vector minimum instructions applied to a vector having triplet maximum values for the ordered matrix row having the low values, a vector having triplet median values for the ordered matrix row having middle values, and a vector having triplet minimum values for the ordered matrix row having high values.

36. A method for rapidly performing a plurality of median filter calculations on a computer processor having vector operation capability for a value at a predetermined position in a matrix of values representing a 3×3 neighborhood about the predetermined position, the matrix having columns and rows, comprising the steps of:
    inputting rows for median filtering, the number of rows being one more than the number of rows in the neighborhood;
    presorting rows that participate in more than one median filter calculation;
    separating the input rows into separate matrices each having the pre-sorted rows and one unsorted row;
    ordering the values in each column of each matrix to result in ordered matrices;
    determining a maximum value for a row of each ordered matrix having the lowest values;
    determining a median value for a row of each ordered matrix having middle values;
    determining a minimum value for a row of each ordered matrix having the highest values;
    determining a second median value of the previously determined maximum value for a row of each ordered matrix having the lowest values, median value for a row of each ordered matrix having middle values, and minimum value for a row of each ordered matrix having the highest values; and
    outputting the second median values as a median filter value for the separated matrices;
wherein the steps of the method are performed by the computer processor using vector operations.

37. The method of claim 36, wherein the matrix rows are represented as vectors that include more than three values.

38. The method of claim 37, wherein determining a maximum value for a row of the ordered matrix having the lowest values comprises determining a maximum value from among a triplet of values in the vector corresponding to that row in columns corresponding to the 3×3 neighborhood.

39. A method for rapidly performing a median filter calculation on a computer processor having vector operation capability for a value at a predetermined position in a matrix of values representing a neighborhood about the predetermined position, the matrix having columns and rows, comprising the steps of:
    inputting the matrix of values to the computer processor as an input matrix, the matrix rows being represented as vectors;
    ordering the values in each column of the matrix to create an ordered matrix having rows;
    determining a maximum value for a row of the ordered matrix having the lowest values;
    determining a median value for a row of the ordered matrix having middle values;
    determining a minimum value for a row of the ordered matrix having the highest values;
    determining a second median value of the previously determined maximum value for a row of the ordered matrix having the lowest values, median value for a row of the ordered matrix having middle values, and minimum value for a row of the ordered matrix having the highest values; and
    outputting by the computer processor of the second median value as a median filter value for the matrix;
wherein the ordering and determining steps are performed as vector operations by the computer processor and the ordering of values within columns of the matrix is performed using two vector maximum operations and two vector minimum operations.

40. The method of claim 39, further comprising the step of input ting an input matrix for processing, the input matrix having one more row than the matrix of values representing a neighborhood before the step of ordering values.

41. The method of claim 40, wherein the step of ordering of values in columns comprises:
    presorting all but the first and last rows of the input matrix;
    separating the input matrix into two matrices, each of the two matrices including the presorted rows and a different one of the first and last rows of the input matrix, a first one of the two matrices being selected for application of the further steps of the method.

42. The method of claim 41, wherein the further steps of the method are separately applied to a second of the two matrices.

43. The method of claim 42, wherein instructions for performing the further steps of the method for each of the two matrices are interleaved.

44. The method of claim 39, wherein matrix of values representing a neighborhood is a 3×3 matrix.

45. The method of claim 44, wherein the matrix rows represented as vectors include more than three values.

46. The method of claim 45, wherein the step of determining a maximum value for a row of the ordered matrix having the lowest values comprises determining a maximum value from among a triplet of values in the vector corresponding to that row in columns corresponding to the 3×3 neighborhood.

47. The method of claim 46, wherein determining a maximum from among a triplet of values comprises two vector maximum operations having the vector corresponding to the row of the ordered matrix having the lowest values, a left shifted form of that row, and a right shifted form of that row as inputs to result in an output vector containing maximum values for a plurality of triplets.

48. The method of claim 45, wherein the step of determining a minimum value for a row of the ordered matrix having the highest values comprises determining a minimum value from among a triplet of values in the vector corresponding to that row and in columns corresponding to the 3×3 neighborhood.

49. The method of claim 48, wherein determining a minimum from among a triplet of values comprises two vector minimum operations having the vector corresponding to the row of the ordered matrix having the highest values, a left shifted form of that row, and a right shifted form of that row as inputs to result in an output vector containing minimum values for a plurality of triplets.

50. The method of claim 45, wherein the step of determining a median value for a row of the ordered matrix having middle values comprises determining a median value from among a triplet of values in the vector corresponding to that row in columns corresponding to the 3×3 neighborhood.

51. The method of claim 50, wherein a plurality of triplet median values are determined using two vector maximum and two vector minimum instructions.

52. The method of claim 45, wherein a plurality of second median values are determined using two vector maximum and two vector minimum instructions applied to a vector having triplet maximum values for the ordered matrix row having the low values, a vector having triplet median values for the ordered matrix row having middle values, and a vector having triplet minimum values for the ordered matrix row having high values.

* * * * *

UNITED STATES PATENT AND TRADEMARK OFFICE
CERTIFICATE OF CORRECTION

PATENT NO. : 6,754,684 B1  Page 1 of 1
DATED : June 22, 2004
INVENTOR(S) : Valeri Kotlov It is certified that error appears in the above-identified patent and that said Letters Patent is hereby corrected as shown below:

Title page,
Item [73], Assignee, following "Mercury Computer Systems, Inc.," please delete "Foxboro" and insert -- Chelmsford --.

Column 14,
Line 24, following "of input", please delete the space

Signed and Sealed this

Twelfth Day of October, 2004

JON W. DUDAS
*Director of the United States Patent and Trademark Office*